April 9, 1940.　　　J. WENTWORTH　　　2,196,484
ELECTRIC HEATING DEVICE
Filed Feb. 28, 1938

Inventor:
John Wentworth
By Bauer, Jackson, Bouthe & Brauer
Attys.

Patented Apr. 9, 1940

2,196,484

UNITED STATES PATENT OFFICE 2,196,484

ELECTRIC HEATING DEVICE

John Wentworth, Chicago, Ill.

Application February 28, 1938, Serial No. 192,942

11 Claims. (Cl. 219—37)

This invention relates to electrical heating devices, and has to do with a device in the nature of a hot plate suitable for use in electric cook stoves and for other purposes.

In my copending application for Heating means and method, Serial No. 192,941, filed February 28, 1938, I have disclosed a heating device comprising a hermetically sealed cell within which is disposed a resistance element, this cell containing an inert gas or vapor of a character to permit of heating the resistance element to incandescence without injury thereto, while expediting transfer of heat, by convection, from the heating element to one wall of the cell pervious to heat, the remaining walls of the cell being impervious to heat. Transfer of heat from the resistance element to the heat pervious wall of the cell is accomplished in large part by radiation, the inert gas or vapor assuring that the heat pervious wall of the cell will be heated to substantially uniform temperature throughout its area, avoiding objectionable hot spots, while also avoiding objectionably high heating of any of the other walls of the cell. The principles involved have been set forth in detail in my above identified copending application and need not be repeated here.

The device of the instant application is in the nature of an improvement over the device disclosed in my above identified copending application. An important object is so to construct and arrange the cell and associated elements as to assure that the inert gas or vapor will have maximum area of contact with the resistance heating element and will act to best advantage to effect transfer of heat, by convection, from such element and the walls of the cell to the heat pervious wall, in a manner to assure substantially uniform heating thereof while preventing objectionably high heating of any other of the walls of the cell. A further object is to provide a cell structure formed, in the main, from suitable refractory electrical and heat insulating material, in conjunction with a metal cover closing the cell and secured thereto in a manner accommodating expansion and contraction of the cover structure relative to the refractory portion or body of the cell, thus avoiding subjecting the latter to injurious stresses. It is also an object to provide improved means for effecting electrical connection to the terminals of the resistance heating element within the cell. An additional object is the provision of a heat insulating base enclosing the major portion of the refractory cell body and so related thereto and to the cover structure as to be shielded by the latter, while preventing any appreciable transfer of heat from the cover structure to the base structure. Further objects and advantages will appear from the detail description.

In the drawing—

The cell comprises a cup-shaped body 3 formed of a suitable refractory and electrical insulating material, which is impervious to gases. Preferably, the body 3 is formed of a vitreous material, such as glass or porcelain, the latter being preferred and, preferably, having those portions of its surface which are exposed to the interior of the cell glazed, to eliminate possibility of leakage of gases and also, with respect to certain portions thereof, to provide reflecting surfaces.

Figure 2:
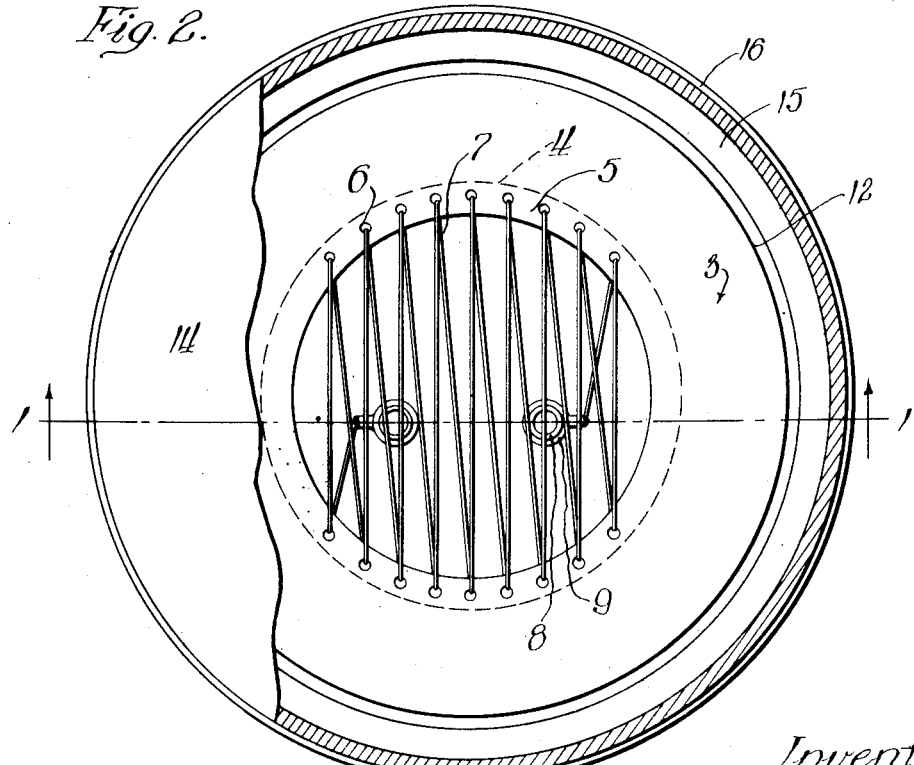
Figure 2 is a view, partly in plan and partly in horizontal section, taken substantially on line 2—2 of Figure 1.

Body 3 defines an interior cylindrical chamber 4 of considerable depth, at the top of which is provided an inwardly projecting circumferential flange 5 formed integrally with body 3. Flange 5 is provided, at opposite sides thereof, with two series of openings 6 extending therethrough. A resistance element 7, preferably a fine tungsten wire, which is not coiled, is threaded through openings 6 of flange 5 being thus arranged across the top of chamber 4 in a plurality of runs comprising an upper series and a lower series, the runs of the upper series being disposed in substantially parallel relation and the runs of the lower series being inclined to those of the upper series and extending across the chamber therebetween, as shown in Figure 2. In this manner, the maximum possible area of the resistance element 7 is exposed for contact by an inert gas or vapor contained within the cell.

Two terminal posts 8 extend through the bottom wall of body 3 and are secured therethrough in gas tight sealing contact therewith in a suitable manner. Preferably, the posts 8 are fused through the wall of body 3, in the process of making the latter, being thus fused in the material of the body and, in effect, integrally united therewith. It will be understood that posts 8 are formed of a suitable known metal alloy having a coefficient of expansion the same as that of the material of body 3, or sufficiently near thereto to eliminate possibility of separation of the posts 8 from the material of body 3, or injury to the latter, due to expansion and contraction of the posts 8 in the use of the device. Each of the posts 8 is provided adjacent its upper end, within chamber 4, with a terminal clip 9 mounted thereon and connected to a terminal of the resistance element 7. The terminal posts 8 project downward exteriorly of body 3 and are there provided with terminal clips 10 for connection to electrical conductors. Posts 8 are of tubular construction, open at their upper or inner ends into chamber 4 and are closed at their outer ends, at 11, after completion of the cell, as will be explained presently.

Body 3 is provided, at its upper end, with a relatively thick outwardly projecting circumferential flange 12. This flange has secured therein inner flange 13ª of a metal ring 13. Ring 13 is secured to flange 12 by embedding flange 13ª in the body flange 12 during molding of the body under heat and pressure, so that flange 13ª of the ring 13 is fused in the flange 12 of body 3, forming therewith a gas tight seal. Ring 13 is formed of a metal alloy having a coefficient of expansion the same as that of the material of body 3, or sufficiently near thereto to prevent objectionable stresses such as would cause breakage of flange 12 or separation therefrom of flange 13ª of ring 13, due to expansion and contraction of the latter. Such alloys are known and need not be described in detail. It may be noted that where the metal ring is fused to the vitreous material of body 3, the sealing bond between the parts is not destroyed even though there is an appreciable difference in the coefficient of expansion of the material of this ring and the material of body 3. Accordingly, the ring 13 may be formed of a metal or a metal alloy having a coefficient of expansion such as to avoid destruction of the sealing bond between this ring and the associated body of the cell.

Ring 13 is formed of a metal or metal alloy suitable for welding and is provided with an upwardly offset outer flange 13ᵇ spaced outward from flange 12 of body 3. A cover plate 14, which constitutes the heat pervious wall of the cell, extends over body 3 and is spaced from the upper surface thereof. This cover plate is made of a metal such as stainless steel, or other alloy which does not readily oxidize or scale when heated to a high temperature, i. e., substantially to incandescence, and which is readily weldable. Plate 14 is provided with an integral depending flange 15 bent transversely into approximately S-shape, being thus formed of corrugated cross-section. Flange 15 is provided, at its lower edge, with an outwardly extending flange 15ª which seats upon the upper face of flange 13ᵇ of ring 13. The flanges 15ª and 13ᵇ are secured together, at their outer edges, by a continuous gas tight weld 16. The cover structure comprising ring 13 and cover plate 14, forms with the vitreous body 3 a hermetically sealed gas tight cell. The flange 15 of cover 14 and the upwardly offset flange 13ᵇ of ring 13 cooperate to provide an expansion joint, which accommodates expansion and contraction of the cover plate relative to the vitreous body 3 of the cell, thus avoid subjecting the latter to objectionable and possibly injurious stresses.

Figure 1:
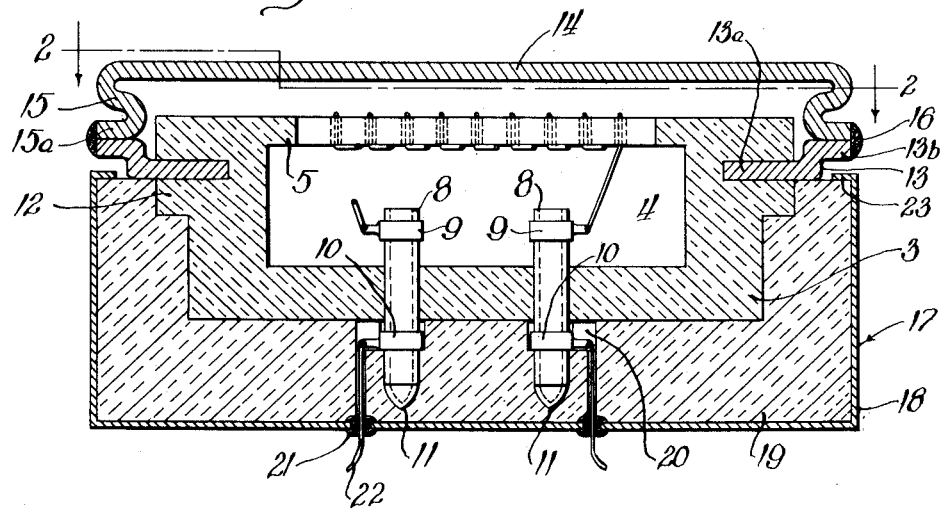
Figure 1 is a transverse vertical sectional view, taken substantially on line 1—1 of Figure 2, of a heating device embodying my invention.

After the cover plate 14 has thus been secured to ring 13, completing the structure of the cell, air contained within the cell may be exhausted therefrom through one of the terminal posts 8, the lower ends of the posts remaining open, and an inert gas, conveniently nitrogen, may be admitted to the interior of the cell, through the other post 8, after which the lower ends of these posts are fused closed, providing gas tight seals therefor, such lower ends of the posts then appearing as shown in Figure 1. Instead of nitrogen, other low molecular weight gases, such as helium, or mixtures of gases which are inert and of relatively light weight, may be employed as the gaseous filling for the cell. Rare gases, such as argon and the like, or mixtures thereof with nitrogen, may also be employed. Instead of using a fixed gas, a vapor may be utilized, for example, the vapor of triethanolamine, or any other suitable vapor. In general, however, a fixed gas is preferable.

In order to prevent any objectionable loss of heat through the other walls of the cell, I provide a heavily lagged base supporting structure 17 therefor. This structure includes a sheet metal casing 18 and a body 19 of heat insulating material, preferably asbestos, defining a cavity conforming to and snugly receiving the portion of vitreous body 3 below ring 13. The asbestos body or lagging 19 is further provided with appropriate recesses 20, which accommodate the lower portions of posts 8 and associated clips 10. Casing 18 is provided, through its bottom wall, with two spaced openings in which are mounted rubber grommets 21, which receive electric conductors or wires 22 appropriately connected to clips 10. This provides convenient means for connecting the resistance element 7 to a suitable source of electrical energy. Sheet metal casing 18 is provided, at its top, with an inwardly projecting circumferential flange 23, this flange extending inward over the upper base of the asbestos lagging 19, with its inner edge spaced outward away from ring 13 and being spaced downward away from flange 13ᵇ of ring 13. In this manner, the upper surface of the asbestos lagging 19 is effectively shielded by flange 23 and ring 13, and, by disposing flange 23 out of thermal connection with ring 13, objectionable transfer of heat from the ring to the sheet metal casing 18 is avoided.

In the use of the device, assuming the cell to be filled with a suitable inert gas, such as nitrogen, when current is passed through the fine tungsten wire 7 the latter is heated to a high temperature. It then gives off heat by the radiant effect or principle. Radiation is more effective the hotter the wire, that is, the greater the temperature difference between the radiating body and the receiving body. The transfer of heat by radiation is generally stated to be a function of the fourth power of the temperature of the hot body. The higher the temperature of the resistance element 7 the more effective is the transfer of heat therefrom, by radiation, to the cover plate 14. In addition to transfer of heat by radiation, heat from the resistance element 7 is transferred to the cover plate 14 by the convection currents of the inert gas flowing over the runs of the resistance element. In that respect, having the chamber 4 of considerable depth, with the resistance element disposed well above the bottom of this chamber, is of material assistance in facilitating ready flow of the gas into and out of this chamber and over the runs of the resistance element. In this manner the inert gas contributes materially to transfer of heat by convection, assuring substantially uniform heating of the cover plate 14 and preventing any localized heating effect or hot spot thereon. Further, the presence of the gas prevents heating of any portion of the vitreous body 3 to a temperature appreciably higher than the temperature of cover plate 14. Also, the reflecting interior surface of chamber 4 is of assistance in reflecting the heat radiated from element 7 upward into contact with cover plate 14, serving further to prevent heat flow to any objectionable extent through the walls of vitreous member 3. The gas also enters into the hollow posts 8 and serves, by convection, to prevent localized heating thereof to an objectionable extent. A further advantage of having the posts 8 of hollow construction is that the mass thereof is rendered quite small, reducing any tendency to objectionable expansion and contraction thereof, such as might tend to destroy the fused bond between the posts and wall of the vitrified body member 3. The inert gas also serves to prevent oxidation, scaling or evaporization of resistance element 7, thus greatly prolonging the life thereof and permitting this element to be heated to incandescence for considerable periods of time, which contributes materially to the heat transfer efficiency of the device.

While the cell preferably is filled with an inert gas or vapor, for the reasons stated above, that is not essential to the broader aspects of my invention. The device, with the air evacuated therefrom so as to prevent oxidation of the resistance element 7, and without an inert gas or vapor filling, is efficient for many purposes. While the cover plate 14 has been referred to as at the top of the cell, for purposes of description, it will be understood that the cell may be disposed in any suitable desired position and that the inert gas or vapor filling, when used, is efficient for effecting heat transfer by convection in any position of the cell.

I claim:

1. In an electrical heating device of the character described, a substantially cup-shaped body of electrical and thermal insulating material impervious to gases and defining a chamber open at its top, said body being provided with flange means projecting inwardly of said chamber spaced from the bottom thereof, a resistance element mounted on said flange means in a plurality of runs extending across said chamber, and a metal cover spaced above said resistance element extending over and secured to said body in gas tight sealing engagement therewith.

2. In an electrical heating device of the character described, a substantially cup-shaped body of electrical and thermal insulating material impervious to gases and defining a chamber open at its top, said body being provided with a flange extending about the top of said chamber and projecting inwardly thereof, said flange being provided with spaced openings, a resistance element threaded through said openings arranged in a plurality of runs extending across said chamber, and a metal cover spaced above said resistance element extending over and secured to said body in gas tight sealing engagement therewith.

3. In an electrical heating device of the character described, a substantially cup-shaped body of electrical and thermal insulating material impervious to gases and defining a chamber open at its top, a resistance element extending across said chamber spaced from the bottom thereof, and a metal cover extending over and secured to said body in gas tight sealing engagement therewith, with provision for relative expansion and contraction of said cover and said body.

4. In an electrical heating device of the character described, a substantially cup-shaped body of refractory electrical insulating material impervious to gases and defining a chamber open at its top, a resistance element extending across said chamber spaced from the bottom thereof, a metal ring secured to said body in gas tight sealing contact therewith extending thereabout and outward therefrom, and a metal cover extending over said body seating upon and secured to said ring in gas tight sealing relation thereto, said cover and said ring having cooperating elements providing an expansion joint accommodating expansion and contraction of said cover relative to said body.

5. In an electrical heating device of the character described, a body formed of vitreous material defining a chamber open at its top and otherwise closed, a resistance element extending across the top of said chamber, a metal ring secured to said body in gas tight sealing engagement therewith extending thereabout and outward therefrom, and a metal cover spaced above said resistance element extending over said body seating upon and secured to said ring in gas tight sealing relation thereto, said cover and said ring having cooperating means comprising an element bent transversely providing an expansion joint accommodating expansion and contraction of said cover relative to said body.

6. In an electrical heating device of the character described, a body formed of vitreous material defining a chamber open at its top and otherwise closed, a resistance element extending across the top of said chamber, a metal ring secured to said body in gas tight sealing engagement therewith extending thereabout and outward therefrom, and a metal cover spaced above said resistance element extending over said body seating upon and secured to said ring in gas tight sealing relation thereto, said cover and said ring having cooperating means comprising an element of corrugated cross-section providing an expansion joint accommodating expansion and contraction of said cover relative to said body.

7. In an electrical heating device of the character described, a body formed of vitreous material defining a chamber open at its top and otherwise closed, a resistance element extending across the top of said chamber, a metal ring comprising an inner flange and an upwardly off-set outer flange, said ring extending about said body with its inner flange secured in said body in gas tight sealing engagement therewith and its outer flange extending outward beyond said body, and a metal cover spaced above said resistance element and extending over said body, said cover having a depending peripheral flange of corrugated cross-section spaced outward from said body seating on and secured to the outer flange of said ring in gas tight sealing relation thereto.

8. In an electrical heating device of the character described, a body formed of vitreous material defining a chamber open at its top and otherwise closed, a resistance element extending across the top of said chamber, a metal ring comprising an inner flange and an upwardly off-set outer flange, said ring extending about said body with its inner flange secured in said body in gas tight sealing engagement therewith and its outer flange extending outward beyond said body, and a metal cover spaced above said resistance element and extending over said body, said cover having a depending peripheral flange of corrugated cross-section spaced outward from said body seating on the outer flange of said ring and secured at its outer edge to the outer edge of said outer flange by a continuous gas tight weld.

9. In an electrical heating device of the character described, a hermetically sealed gas tight cell comprising a vitreous body and a metal cover structure therefor, a resistance element within said cell, said cover structure comprising a metal ring having an inner flange secured in said body adjacent the top thereof and an upwardly off-set outer flange, and a base structure comprising a body of heat insulating material enclosing the portion of said vitreous body below said inner flange and a metal casing enclosing said insulating material provided with a flange extending inward over the upper face of said insulating material and beneath said outer flange spaced downward therefrom with its inner edge spaced away from said inner flange.

10. In an electrical heating device of the character described, a hermetically sealed gas tight cell comprising a vitreous body, a resistance element within said cell, and metal terminal posts extending through the wall of said body fused therein in gas tight sealing engagement therewith and connected to the terminals of said element, said posts being tubular and open to the interior of said cell and closed exteriorly thereof.

11. In an electrical heating device of the character described, a hermetically sealed gas tight cell comprising a vitreous body, a resistance element within said cell, and metal terminal posts extending through the wall of said body fused therein in gas tight sealing engagement therewith and connected to the terminals of said element, said posts being tubular and having their inner ends open and being otherwise closed.

JOHN WENTWORTH.